(12) United States Patent
Koga et al.

(10) Patent No.: US 9,605,820 B2
(45) Date of Patent: Mar. 28, 2017

(54) LIGHTING DEVICE

(71) Applicant: Toshiba Lighting & Technology Corporation, Yokosuka-shi, Kanagawa-ken (JP)

(72) Inventors: Ryuichi Koga, Yokosuka (JP); Hiroyuki Kuramochi, Yokosuka (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 260 days.

(21) Appl. No.: 14/484,628

(22) Filed: Sep. 12, 2014

(65) Prior Publication Data
US 2015/0260362 A1 Sep. 17, 2015

(30) Foreign Application Priority Data
Mar. 17, 2014 (JP) .................................. 2014-054032

(51) Int. Cl.
| | | |
|---|---|---|
| B60Q 3/04 | (2006.01) |
| F21S 8/08 | (2006.01) |
| F21V 19/04 | (2006.01) |
| H05B 33/08 | (2006.01) |
| H05B 37/02 | (2006.01) |
| F21V 31/00 | (2006.01) |
| F21W 131/103 | (2006.01) |
| F21V 15/01 | (2006.01) |
| F21V 17/10 | (2006.01) |
| F21V 21/116 | (2006.01) |
| F21Y 113/00 | (2016.01) |
| F21Y 101/00 | (2016.01) |

(52) U.S. Cl.
CPC ............ *F21S 8/086* (2013.01); *F21V 19/045* (2013.01); *H05B 33/0803* (2013.01); *H05B 37/0245* (2013.01); *F21V 15/01* (2013.01); *F21V 17/107* (2013.01); *F21V 21/116* (2013.01); *F21V 31/005* (2013.01); *F21W 2131/103* (2013.01); *F21Y 2101/00* (2013.01); *F21Y 2105/10* (2016.08); *F21Y 2113/00* (2013.01); *F21Y 2115/10* (2016.08); *Y02B 20/72* (2013.01)

(58) Field of Classification Search
CPC ......... F21S 8/086; F21V 21/30; F21V 31/005
See application file for complete search history.

(56) References Cited

U.S. PATENT DOCUMENTS

| | | | |
|---|---|---|---|
| 2009/0034265 A1* | 2/2009 | Orellana ................. | F21S 8/086 362/310 |
| 2011/0134239 A1* | 6/2011 | Vadai ...................... | F21S 2/00 348/143 |
| 2012/0140473 A1* | 6/2012 | Chang .................... | F21S 2/005 362/249.03 |
| 2015/0167943 A1* | 6/2015 | Rugendyke ............. | F21L 4/04 362/294 |

* cited by examiner

*Primary Examiner* — Evan Dzierzynski
(74) *Attorney, Agent, or Firm* — Banner & Witcoff, Ltd.

(57) ABSTRACT

According to one embodiment, a lighting device includes: a first housing in which a lamp unit is provided; a second housing in which a power supply unit is provided; and a hinge member that allows the first housing to be capable of opening and closing with respect to the second housing.

20 Claims, 5 Drawing Sheets

LIGHTING DEVICE

CROSS-REFERENCE TO RELATED APPLICATION

This application is based upon and claims the benefit of priority from the prior Japanese Patent Application No. 2014-54032 filed in Japan on Mar. 17, 2014; the entire contents of which are incorporated herein by reference.

FIELD

Embodiments described herein relate generally to a lighting device.

BACKGROUND

As a lighting device, there are various lighting devices including road lamps and street lamps. For example, the road lamp and the street lamp are mounted on an upper portion of a pole having a predetermined height from a road surface.

The lighting device such as the road lamp has a body including a cover member which is capable of opening and closing for the replacement of internal parts, maintenance, or the like.

However, in such a lighting device, there is a problem that the volume thereof is increased by a lamp unit and a power supply unit disposed inside the lighting device.

DETAILED DESCRIPTION

A lighting device of an embodiment has a first housing in which a lamp unit is provided, a second housing in which a power supply unit is provided, and a hinge member that allows the first housing to be capable of opening and closing with respect to the second housing or the second housing to be capable of opening and closing with respect to the first housing.

Hereinafter, the embodiment will be described with reference to the drawings.

Figure 1:
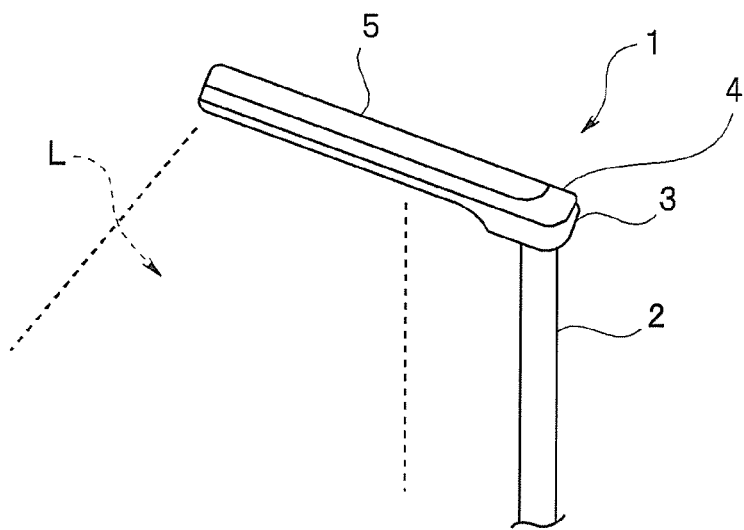
FIG. 1 is a side view of a lighting device according to an embodiment, which is mounted and supported on a pole.

FIG. 1 is a side view of a lighting device 1 according to the embodiment, which is mounted and supported on a pole. FIG. 1 illustrates a case where the lighting device 1 of the embodiment is applied to a road lamp. The lighting device 1 that is the road lamp is mounted on an upper portion of a pole 2 provided on the side of a road. The lighting device 1 is mounted on the upper portion of the pole 2 so that lighting light L is emitted in an obliquely lower direction to light the road.

The lighting device 1 includes three housings, specifically, is configured by including a lower body 3 that is fixed to the pole 2, a frame member 4 that is provided on an upper side of the lower body 3, and an upper cover 5 that is a cover member capable of opening and closing with respect to the frame member 4.

Figure 2:
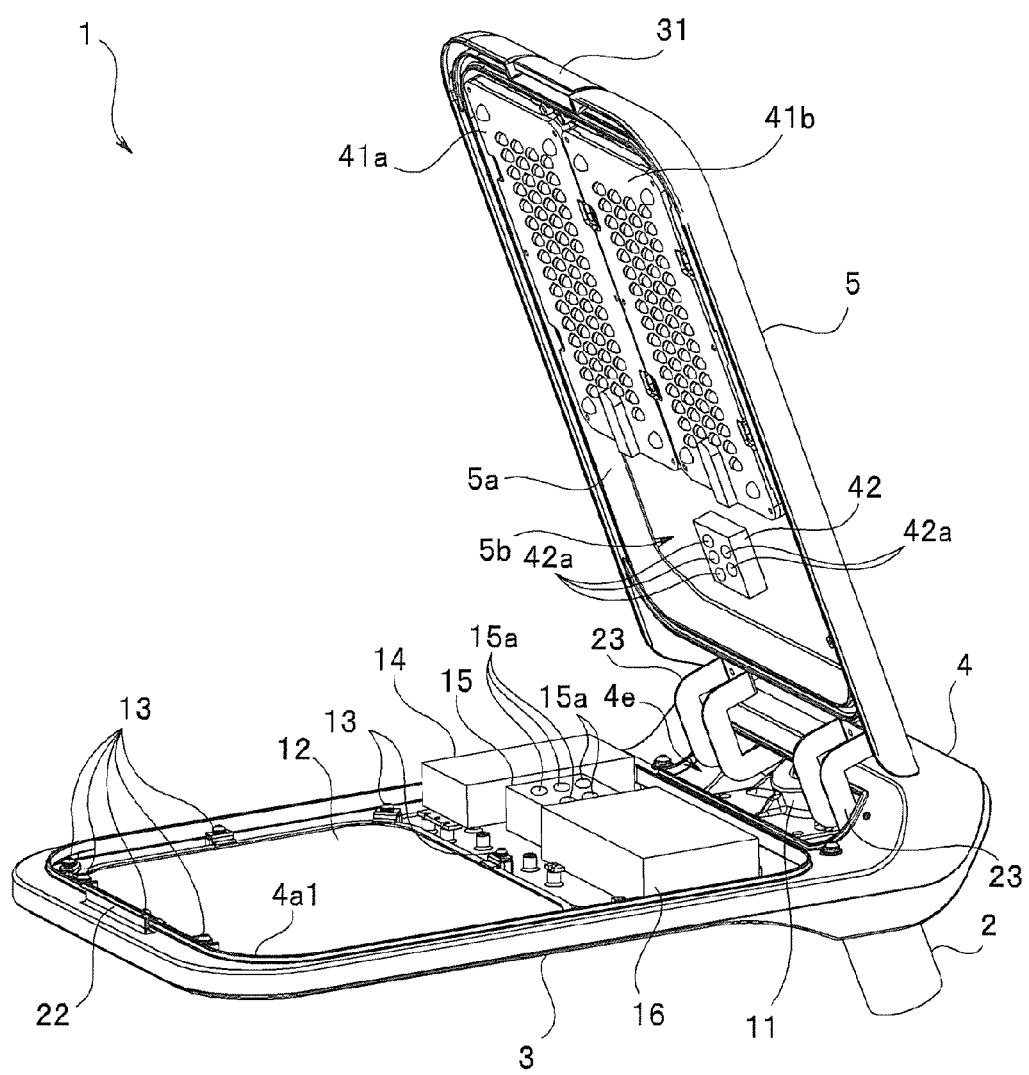
FIG. 2 is a perspective view of the lighting device according to the embodiment, in which an upper cover is opened with respect to a frame member, viewed from an obliquely upper direction.
Figure 3:
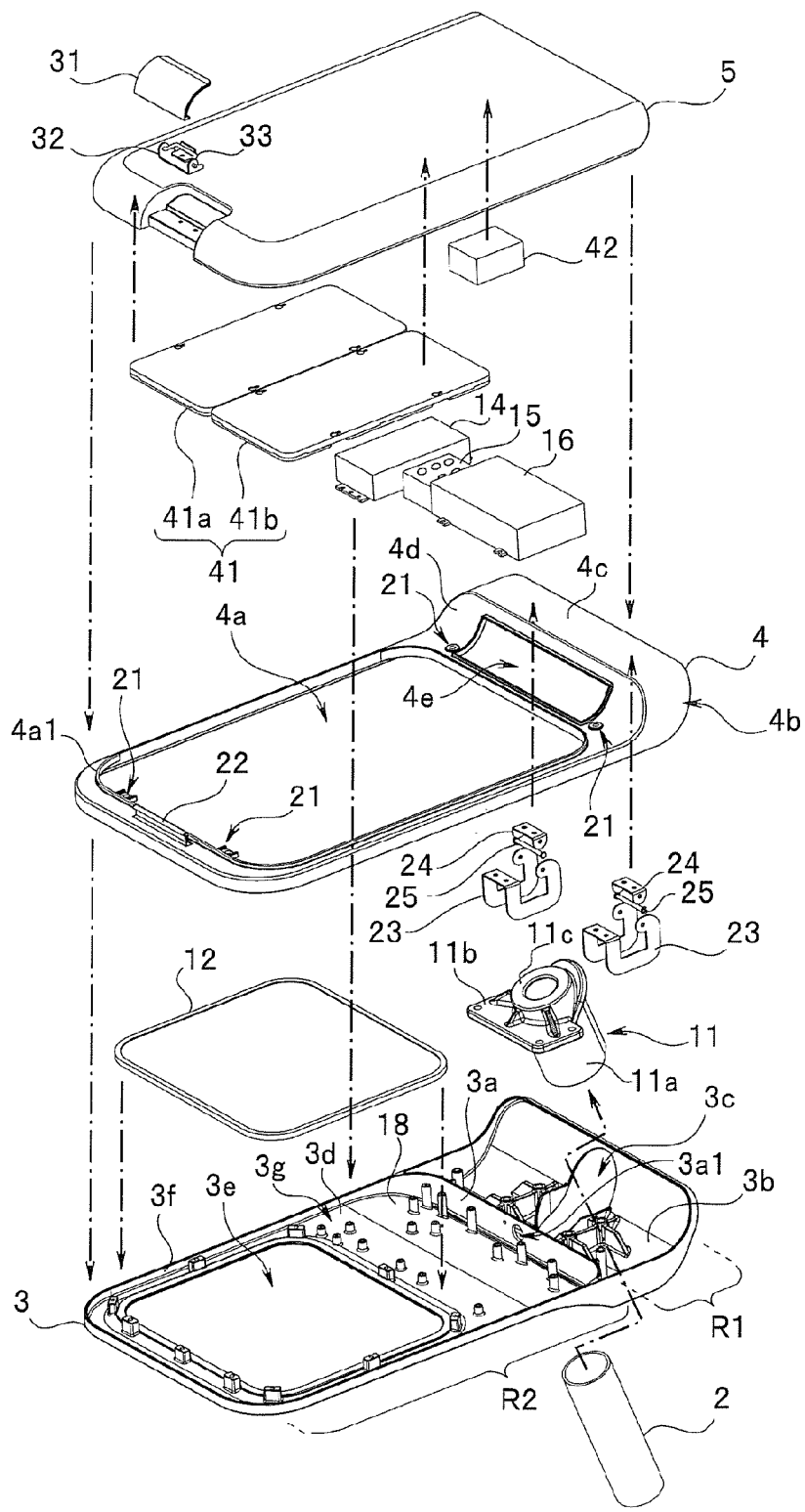
FIG. 3 is an exploded view of the lighting device according to the embodiment.

FIG. 2 is a perspective view of the lighting device 1 in which the upper cover 5 is opened with respect to the frame member 4, viewed from an obliquely upper direction. FIG. 3 is an exploded view of the lighting device 1.

The pole 2 is a support member that supports the lighting device 1. An upper end portion of the pole 2 is connected and fixed to one side of a lower surface of the lower body 3 of the lighting device 1. The lower body 3 has a fixing section for fixing to the pole 2. The fixing section has a pole connection member 11.

The pole connection member 11 that is a fixing member has a cylindrical section 11a into which the pole 2 is inserted and fitted and a mounting plate 11b that is fixed to the cylindrical section 11a in a predetermined angle with respect to the axis of the cylindrical section 11a.

As illustrated in FIG. 3, the lower body 3 is substantially a box shape an upper portion of which is opened. The lower body 3 has a wall section 3a near the side to which the pole 2 is connected. The wall section 3a divides the inside of the lower body 3 into two regions R1 and R2.

A hole 3c through which the cylindrical section 11a of the pole connection member 11 passes is formed in a bottom surface section 3b of the lower body 3 in the region R1.

When the cylindrical section 11a of the pole connection member 11 is inserted into the hole 3c from the inside of the lower body 3 and the upper end portion of the pole 2 is inserted into the inside of the cylindrical section 11a, the end of the pole 2 abuts an inward flange 11c provided on the upper side of the cylindrical section 11a. The mounting plate 11b is screwed and fixed by screws (not illustrated) onto the inside of the lower body 3. As a result, the lower body 3 is fixed to the pole 2.

The upper end portion of the pole 2 is connected and fixed to the lower body 3 by the pole connection member 11, whereby the pole 2 supports the lower body 3. As described above, the lower body 3 is connected and fixed to the pole 2 by the pole connection member 11 that is a fixing member.

An opening section 3e that emits the lighting light is formed in a bottom surface section 3d of the lower body 3 in the region R2. A transparent cover plate 12 is fixed to the opening section 3e of the bottom surface section 3d to be fastened by fasteners 13 (FIG. 2).

Since the pole 2 is provided on the side of the road, the opening section 3e emitting the lighting light is positioned on the road side.

A communication unit 14, a contact unit 15, and a power supply unit 16 are fixed to the bottom surface section 3d of the lower body 3 in the region R2. The communication unit 14, the contact unit 15, and the power supply unit 16 are disposed near the wall section 3a in the region R2.

The communication unit 14 is a circuit unit that receives various command signals and light adjusting signals from the outside and transmits status information such as failure information.

The contact unit 15 provided in the lower body 3 is an electrical contact section having a plurality (five in the embodiment) of contacts 15a. Two contacts are provided for the power supply, two contacts are provided for the signal, and the remaining one is provided for a ground among the five contacts.

The power supply unit 16 is a circuit for supplying power to a lamp unit 41 of the upper cover 5 through the contact unit 15 when receiving a power supply from the outside and supplying power to the communication unit 14 inside the lighting device 1.

Cables (not illustrated) including a power supply line and a signal line for supplying the power and the signal to the lighting device 1 pass through the inside of the pole 2 and are drawn from an opening section of the inward flange 11c of the pole connection member 11 into the region R1 of the lower body 3. A hole 3a1 is formed in the wall section 3a.

The cables are introduced into the region R2 through a waterproof connector provided in the hole 3a1 and are connected to a substrate (not illustrated). The power from the power supply line and the signal from the signal line are supplied to the communication unit 14, the contact unit 15, and the power supply unit 16 through the substrate.

The lower body 3 has a concave section 3g that is formed being surrounded by the wall section 3a and side walls 3f. Electrical parts of the communication unit 14, the contact unit 15, and the power supply unit 16 are disposed inside the concave section 3g formed by the wall section 3a and three side walls 3f.

Furthermore, a bottom surface section 3d of the concave section 3g has an inclined section 18 that is inclined toward the wall section 3a.

Figure 4:
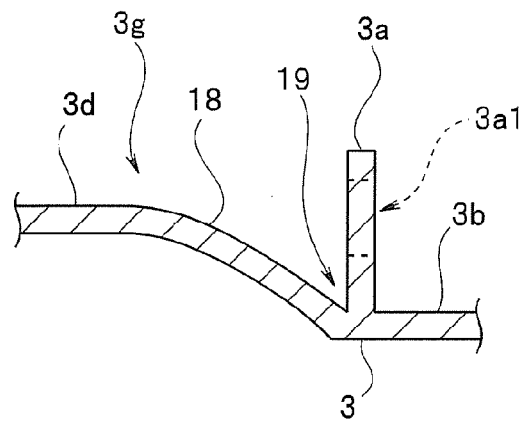
FIG. 4 is a partial cross-sectional view of a lower body according to the embodiment for describing a valley section.

FIG. 4 is a partial cross-sectional view of the lower body 3 for describing a valley section 19. The inclined section 18 has an inclined surface leading down to the wall section 3a. The valley section 19 forming a boundary section between the inclined section 18 and the wall section 3a is provided in the concave section 3g.

As illustrated in FIG. 4, the inclined section 18 leads down to the wall section 3a. Even after the lighting device 1 is mounted on the pole 2, the inclined section 18 has an inclined angle that leads down to the wall section 3a.

Therefore, water entering the concave section 3g or water formed of condensed moisture collected in the concave section 3g flows down to the valley section 19 along the inclined section 18 and collects in the valley section 19. Therefore, in any case, it is possible to prevent the water having entered the lighting device 1 or formed by condensation from coming into contact with the electrical parts of the communication unit 14 and the like.

The frame member 4 is fixed to the upper portion of the lower body 3 by screws (not illustrated) in the four portions illustrated in symbols 21. The frame member 4 has an opening section 4a along an edge of the concave section 3g of the lower body 3 and a protrusion section 22 to which a latch member 31 provided in the upper cover 5 is locked. The opening section 4a has a wall section 4a1 that is formed so as to extend in a direction orthogonal to the plane of the opening section 4a along an edge of the opening.

The communication unit 14, the contact unit 15, and the power supply unit 16 are disposed inside the opening section 4a. The frame member 4 is fixed to the upper side of the lower body 3. The communication unit 14, the contact unit 15, and the power supply unit 16 are exposed from the opening section 4a to the upper side.

Therefore, an operator opens the upper cover 5 and can inspect and replace the communication unit 14, the contact unit 15, and the power supply unit 16 inside the wall section 4a1.

Furthermore, the frame member 4 has a protrusion section 4b protruding toward the upper side when viewed from the side surface. The protrusion section 4b has a planar section 4c. The frame member 4 has an inclined section 4d between the planar section 4c and the opening section 4a thereof, and an opening section 4e is formed in the inclined section 4d thereof. The opening section 4e is an opening for moving two hinge members 23 configuring a hinge section when opening and closing the upper cover 5.

Each hinge member 23 has a U shape. One end of each hinge member 23 is rotatably mounted around a shaft of a shaft member 25 provided in a fixing member 24. The fixing member 24 is fixed to a rear side of the planar section 4c of the frame member 4. That is, the hinge member 23 is fixed to the planar section 4c of the frame member 4.

The upper cover 5 has a shape to cover the inclined section 4d and the opening section 4a of the frame member 4. The other end of each of the two hinge members 23 is fixed to one end portion of a lower surface of the upper cover 5 by screws. Therefore, the two hinge members 23 are fixed to the frame member 4 and the upper cover 5 so that the upper cover 5 is capable of opening and closing with respect to the frame member 4. The two hinge members 23 are fixed to the frame member 4 and the upper cover 5 so that, when the upper cover 5 is closed, a planar section 5a on the upper side of the upper cover 5 and the planar section 4c of the frame member 4 are substantially flush with each other.

Since the frame member 4 is fixed to the lower body 3, the frame member 4 and the lower body 3 can be as a device body. Therefore, the upper cover 5 is configured to cover the frame member 4 or the device body so that the upper cover 5 is capable of opening and closing with respect to the frame member 4, in other words, is capable of separating from the frame member 4.

Moreover, since a length of the upper cover 5 in a longitudinal direction is shorter than that of the lower body 3 in the longitudinal direction, a size of the upper cover 5 is smaller than that of the lower body 3 and the weight of the upper cover 5 is also lighter than that of the lower body 3.

The latch member 31 for fastening when the upper cover 5 is closed is mounted on the upper cover 5 by a fixture 32 having a crank-shaped shaft member 33. When the upper cover 5 is closed, a part of the latch member 31 is locked to the protrusion section 22. The operator can open the upper cover 5 by operating the latch member 31.

As illustrated in FIG. 2, a wall section 5a formed so as to protrude to the lower side is provided in the lower surface of the upper cover 5. A shape of the wall section 5a when the wall section 5a is viewed from the lower side is the same as that of the wall section 4a1 when the wall section 4a1 of the frame member 4 is viewed from the upper side.

The lamp unit 41 and a contact unit 42 are provided inside a concave section 5b formed by the wall section 5a in the lower surface of the upper cover 5. The contact unit 42 is electrically connected to the lamp unit 41 provided in the upper cover 5. When the upper cover 5 is closed, the lamp unit 41 is disposed inside the opening section 4a of the frame member 4. The lighting light from the lamp unit 41 is emitted through the transparent cover plate 12 provided in the opening section 3e of the lower body 3.

The lamp unit 41 is an electrical part configured of two plate-shaped lamp units 41a and 41b. Each of the lamp units 41a and 41b has a plate shape and a plurality of Light Emitting Diodes (LED) disposed in a matrix shape on one surface thereof. Each of the lamp units 41a and 41b is removably mounted on the lower surface of the upper cover 5. Each of the two lamp units 41a and 41b is replaceable.

When the upper cover 5 is closed, the contact unit 42 provided in the upper cover 5 is an electrical contact section that is disposed in a position in which the contact unit 42 comes into contact with the contact unit 15. When the upper cover 5 is closed, each contact of the contact unit 15 is electrically connected to a corresponding contact of the contact unit 42 by coming into contact therewith. When the upper cover 5 is opened, each contact of the contact unit 15 does not come into contact with the corresponding contact of the contact unit 42 by separating therefrom.

Figure 5:
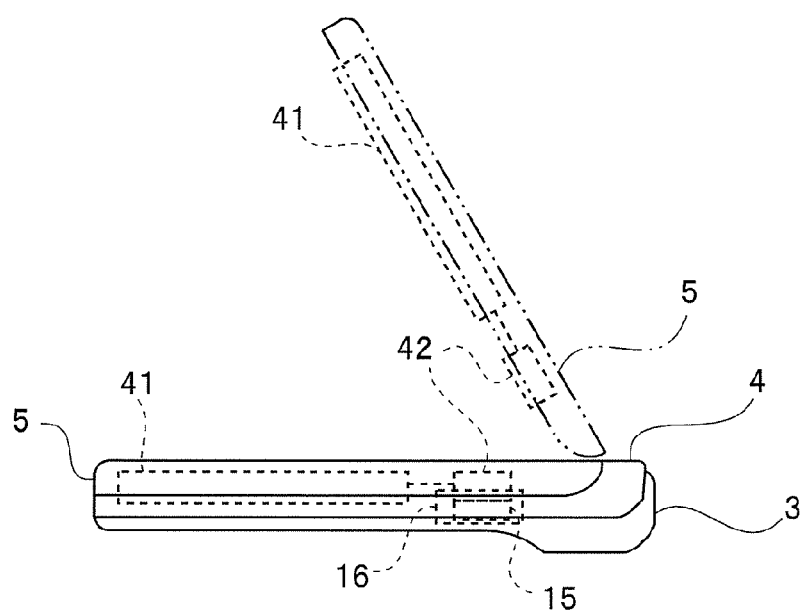
FIG. 5 is a side view of the lighting device according to the embodiment for describing a state when the upper cover is opened and closed.

FIG. 5 is a side view of the lighting device 1 for describing a state when the upper cover 5 is opened and closed. As represented by a two-dotted chain line, when the upper cover 5 is opened, the contact unit 42 is separated from the contact unit 15. When the upper cover 5 is closed, the contact units 42 and 15 come into contact with each other and the power is supplied from the power supply unit 16 to the lamp unit 41 through the contact units 15 and 42.

As illustrated in FIG. 5, when the upper cover 5 is closed, the lamp unit 41 and the power supply unit 16 are disposed in the upper cover 5 and the lower body 3 respectively, so as to be positioned along a direction parallel to the opening plane of the opening section 3e through which the lighting light of the lamp unit 41 is emitted.

That is, the contact unit 42 is an electrical contact section that is provided in the upper cover 5 and when the upper cover 5 covers the frame member 4, the contact unit 42 comes into contact with the contact unit 15, and when the upper cover 5 is separated from the frame member 4, the contact unit 42 is disposed in a position in which the contact unit 42 does not come into contact with the contact unit 15, and the contact unit 42 is electrically connected to the lamp unit 41.

Further, the contact unit 42 includes two or more contacts for the power supply line and the signal line.

Moreover, here, the contact unit 42 includes two or more contacts for the power supply line and the signal line, but may be configured of only a contact for the power supply line or the signal line.

As described above, the lighting device 1 has the electrical connection section such that when the upper cover 5 is closed with respect to the lower body 3, the lighting device 1 performs the supply of power from the power supply unit 16 to the lamp unit 41 and when the upper cover 5 is opened with respect to the lower body 3, the supply of power from the power supply unit 16 to the lamp unit 41 is interrupted. The electrical connection section includes the contact units 15 and 42.

Therefore, when replacing the lamp unit 41a or 41b by opening the upper cover 5, the operator can rapidly perform the replacement in a state where power is not supplied to the lamp units 41a and 41b.

In the related art, wiring for supplying power to the lamp unit is provided between the lamp unit and the power supply unit and when the upper cover is closed, there is a problem that the wiring is sandwiched between the upper cover and the device body, but in the embodiment, since no wiring connecting the lamp unit 41 and the power supply unit 16 exists, the problem that the wiring is sandwiched between the upper cover and the frame member 4 does not occur.

Furthermore, as described above, the lower body 3 has the concave section 3g formed being surrounded by the wall section 3a and the side walls 3f, the frame member 4 has the wall section 4a1 formed along the edge of the opening section 4a, and the upper cover 5 has the wall section 5a having the same shape as the wall section 4a1 of the frame member 4 on the lower surface thereof.

A seal member having elasticity is provided between the wall section 3a and the side wall 3f of the lower body 3, and the wall section 4a1 of the frame member 4. Similarly, a seal member having elasticity is also provided between the wall section 4a1 of the frame member 4 and the wall section 5a of the upper cover 5.

Figure 6:
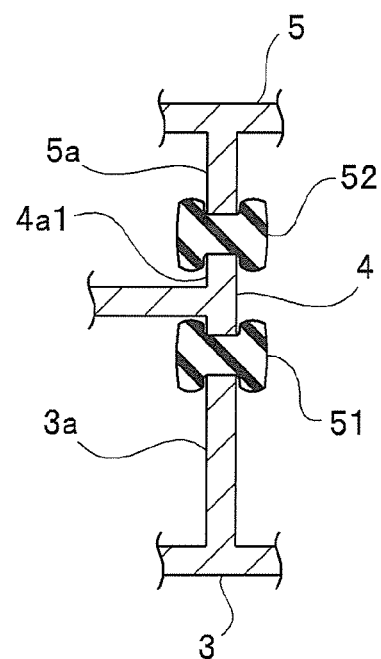
FIG. 6 is a partial cross-sectional view of a wall section of the lower body, a wall section of the frame member, and a wall section of the upper cover according to the embodiment when the upper cover is closed.

FIG. 6 is a partial cross-sectional view of the wall section 3a of the lower body 3, the wall section 4a1 of the frame member 4, and the wall section 5a of the upper cover 5 when the upper cover 5 is closed. A seal member 51 is provided between the edge portion on the upper side of the wall section 3a of the lower body 3 and the edge portion on the lower side of the wall section 4a1 of the frame member 4 by being bonded therebetween using an adhesive and the like. The seal member 51 is provided throughout the entirety of the edge portion on the upper side of the wall section 3a of the lower body 3.

Furthermore, a seal member 52 is provided between the edge portion on the upper side of the wall section 4a1 of the frame member 4 and the edge portion on the lower side of the wall section 5a of the upper cover 5. The seal member 51 is fixed throughout the entirety of one of the edge portion on the upper side of the wall section 4a1 and the edge portion on the lower side of the wall section 5a of the upper cover 5 using an adhesive and the like.

Therefore, when the upper cover 5 is closed, a space that is sealed by the concave section 3g of the lower body 3, the opening section 4a of the frame member 4, and the concave section 5b of the upper cover 5 is formed. Then, the electrical parts such as the communication unit 14 provided in the lower body 3 and the lamp unit 41 provided in the upper cover 5 are disposed inside the sealed space.

Therefore, when the upper cover 5 is closed with respect to the lower body 3 to which the frame member 4 is fixed, the lighting device 1 has a seal structure so that the electrical parts of the communication unit 14 and the like, and the electrical parts of the lamp unit 41 and the like are disposed inside the sealed space.

That is, since the electrical parts are disposed inside the sealed space surrounded by the opening section 4a of the frame member 4, when the upper cover 5 is closed, moisture easily enters the region R1 on the inside of the lower body 3 of the lighting device 1 from the outside, but since the electrical parts are stored inside the sealed space, the electrical parts are not affected by the moisture.

As described above, when the upper cover 5 is opened and closed, stress is applied to the two hinge members 23 and the stress applied to each hinge member 23 causes stress in the frame member 4 through the fixing member 24. After the stress applied to the frame member 4 is dispersed to the frame member 4, the stress occurs in the lower body 3.

As a result, when the upper cover 5 is opened and closed, the stress applied to each hinge member 23 is absorbed by the frame member 4 once, and the stress that occurs in the lower body 3 is not collectively applied to a connection portion of the pole connection member 11.

Therefore, according to the embodiment, it is possible to provide the lighting device whose volume is not large due to the lamp unit and the power supply unit being disposed inside thereof.

Further, according to the embodiment, it is possible to provide the lighting device in which the housing is capable of being opened and closed, and a maintenance operation is easily performed.

Moreover, in the example described above, the lamp unit 41 that is the electrical part is provided in the upper cover 5, but may be provided in the lower body 3. In this case, when the upper cover 5 is closed, the lamp unit 41 and the lower body 3 have contacts for receiving the supply of power in the lamp unit 41 through the contact unit 42.

Furthermore, in the example described above, the communication unit 14 and the power supply unit 16 that are the electrical parts are provided in the lower body 3, but may be provided in the upper cover 5.

Furthermore, the road lamp is described as an example of the lighting device of the embodiment described above, but the lighting device of the embodiment may be applied to other lighting devices such as a street lamp.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. A lighting device comprising:
a first housing having a lamp unit provided on a lower surface so that the lamp emits is configured to emit light downward;
a second housing configured to be connected and fixed to a pole, the second housing having a power supply unit provided on an upper surface; and
a hinge member that allows the first housing to be separated from the second housing by rotating around an axis of a shaft member,
wherein when the first housing is not separated from the second housing, the lamp unit provided in the first housing is located farther from the pole than the power supply unit provided on the upper surface of the second housing.

2. The device according to claim 1,
wherein when the first housing is not separated from the second housing, the lamp unit and the power supply unit are disposed along a direction parallel to an opening plane of a first opening section from which lighting light of the lamp unit is emitted downward.

3. The device according to claim 2, further comprising:
a seal structure that is disposed inside a space in which the lamp unit and the power supply unit are sealed when the first housing is not separated from the second housing.

4. The device according to claim 2, further comprising:
a transparent cover plate,
wherein the lighting light emitted through the first opening section is emitted from the transparent cover plate.

5. The device according to claim 1, further comprising:
a seal structure that is disposed inside a space in which the lamp unit and the power supply unit are sealed when the first housing is not separated from the second housing.

6. The device according to claim 1, further comprising:
a third housing that is fixed to the first housing or the second housing,
wherein one of the first housing and the second housing, to which the third housing is not fixed, is capable of being separated from the other of the first housing and the second housing, to which the third housing is fixed by the hinge member.

7. The device according to claim 6,
wherein the third housing has a second opening section, and
wherein, when the first housing is not separated from the second housing, the lamp unit is disposed inside the second opening section.

8. The device according to claim 7, further comprising:
a communication unit that receives a command signal and a light adjusting signal from the outside and transmits status information,
wherein when the first housing is not separated from the second housing, the communication unit is disposed inside the second opening section.

9. The device according to claim 8,
wherein when the first housing is separated from the second housing in a case where the third housing is fixed to the second housing, the communication unit is exposed from the second opening section.

10. The device according to claim 1,
wherein the lamp unit is provided in the first housing to be removable.

11. The device according to claim 1, further comprising:
a fixing member for connecting and fixing the first housing or the second housing to the pole.

12. The device according to claim 1,
wherein the lighting device is a road lamp.

13. A lighting device comprising:
a first housing having a lamp unit provided on a lower surface so that the lamp unit is configured to emit light downward;
a second housing configured to connect and be fixed to a pole, the second having a power supply unit provided on an upper surface;
a third housing that is fixed to the first housing or the second housing;
a hinge member that allows the first housing to be separated from the second housing by rotating around an axis of a shaft member;
a first opening section that emits lighting light of the lamp unit,
wherein when the first housing is not separated from the second housing, the lamp unit provided in the first housing is located farther from the pole than the power supply unit provided on the upper surface of the second housing, and
wherein when the first housing is not separated from the second housing, the lamp unit and the power supply unit are disposed along a direction parallel to an opening plane of the first opening section.

14. The device according to claim 13, further comprising:
a seal structure that is disposed inside a space in which the lamp unit and the power supply unit are sealed when the first housing is not separated from the second housing.

15. The device according to claim 14, further comprising:
a transparent cover plate that is provided in the first opening section,
wherein the lighting light emitted through the first opening section is emitted from the transparent cover plate.

16. The device according to claim 15,
wherein the third housing has a second opening section, and
wherein when the first housing is not separated from the second housing, the lamp unit is disposed inside the second opening section.

17. The device according to claim 16, further comprising:
a communication unit that receives a command signal and a light adjusting signal from the outside and transmits status information,
wherein when the first housing is not separated from the second housing, the communication unit is disposed inside the second opening section.

18. The device according to claim 17,
wherein when the first housing is not separated from the second housing in a case where the third housing is fixed to the second housing, the communication unit is exposed from the second opening section.

19. The device according to claim 13,
wherein the lamp unit is provided in the first housing to be removable.

20. The device according to claim 13,
wherein the lighting device is a road lamp.

* * * * *